United States Patent
Gianakouros et al.

(10) Patent No.: US 7,415,432 B1
(45) Date of Patent: Aug. 19, 2008

(54) METHOD AND APPARATUS FOR THE RECEIPT, COMBINATION, AND EVALUATION OF EQUITY PORTFOLIOS FOR EXECUTION BY A SPONSOR AT PASSIVELY DETERMINED PRICES

(75) Inventors: Nicholas P. Gianakouros, Cranford, NJ (US); David E. Shaw, New York, NY (US)

(73) Assignee: D.E. Shaw & Co., Inc., New York, NY (US)

( * ) Notice: Subject to any disclaimer, the term of this patent is extended or adjusted under 35 U.S.C. 154(b) by 785 days.

(21) Appl. No.: 09/714,212

(22) Filed: Nov. 17, 2000

(51) Int. Cl.
G06Q 40/00 (2006.01)

(52) U.S. Cl. ............................. 705/36 R; 705/37; 705/35

(58) Field of Classification Search ............. 705/35–37, 705/36 R
See application file for complete search history.

(56) References Cited

U.S. PATENT DOCUMENTS

| | | | | |
|---|---|---|---|---|
| 4,412,287 A | * | 10/1983 | Braddock, III ................ | 705/37 |
| 4,674,044 A | * | 6/1987 | Kalmus et al. ................. | 705/37 |
| 5,077,665 A | * | 12/1991 | Silverman et al. ............. | 705/37 |
| 5,136,501 A | * | 8/1992 | Silverman et al. ............. | 705/37 |
| 5,675,746 A | * | 10/1997 | Marshall ....................... | 705/35 |
| 5,696,907 A | * | 12/1997 | Tom ............................... | 705/38 |
| 5,761,442 A | * | 6/1998 | Barr et al. ...................... | 705/36 |
| 5,784,696 A | * | 7/1998 | Melnikoff ...................... | 705/36 |
| 5,799,287 A | * | 8/1998 | Dembo .......................... | 705/36 |
| 5,806,047 A | * | 9/1998 | Hackel et al. .................. | 705/36 |
| 5,845,266 A | * | 12/1998 | Lupien et al. .................. | 705/36 |
| 5,852,811 A | * | 12/1998 | Atkins ........................... | 705/36 |
| 5,873,071 A | * | 2/1999 | Ferstenberg et al. .......... | 705/37 |
| 5,940,811 A | * | 8/1999 | Norris ........................... | 705/38 |
| 5,946,666 A | * | 8/1999 | Nevo et al. .................... | 705/36 |
| 5,950,176 A | * | 9/1999 | Keiser et al. .................. | 705/37 |
| 5,950,177 A | * | 9/1999 | Lupien et al. .................. | 705/37 |
| 5,978,778 A | * | 11/1999 | O'Shaughnessy ............ | 705/36 |
| 5,987,435 A | * | 11/1999 | Weiss et al. ................... | 705/36 |
| 6,012,044 A | * | 1/2000 | Maggioncalda et al. ....... | 705/36 |
| 6,012,046 A | * | 1/2000 | Lupien et al. .................. | 705/37 |
| 6,014,643 A | * | 1/2000 | Minton .......................... | 705/37 |
| 6,021,397 A | * | 2/2000 | Jones et al. .................... | 705/36 |
| 6,035,287 A | * | 3/2000 | Stallaert et al. ................ | 705/37 |
| 6,064,985 A | * | 5/2000 | Anderson ...................... | 705/36 |
| 6,105,007 A | * | 8/2000 | Norris ........................... | 705/38 |
| 6,119,103 A | * | 9/2000 | Basch et al. ................... | 705/35 |
| 6,122,623 A | * | 9/2000 | Garman ......................... | 705/36 |
| 6,161,098 A | * | 12/2000 | Wallman ....................... | 705/36 |

(Continued)

FOREIGN PATENT DOCUMENTS

JP 2005242589 A * 9/2005

(Continued)

*Primary Examiner*—Narayanswamy Subramanian
(74) *Attorney, Agent, or Firm*—Kenyon & Kenyon LLP (57) ABSTRACT

The present invention is directed to a system for the electronic trading of financial instruments, and in particular, a system and method for the receipt, combination, and evaluation of equity portfolios for possible simultaneous execution by a sponsor at passively determined prices. In accordance with an embodiment of the present invention, a method for trading securities portfolios includes receiving a first intended portfolio trade having an associated specified commission, evaluating a combination of the first intended portfolio trade and a second intended portfolio trade for possible execution; and transmitting a decision on whether to execute the combination of the first intended portfolio trade and the second intended portfolio trade.

50 Claims, 8 Drawing Sheets

U.S. PATENT DOCUMENTS

| | | | |
|---|---|---|---|
| 6,317,728 B1 * | 11/2001 | Kane | 705/37 |
| 6,601,044 B1 * | 7/2003 | Wallman | 705/36 R |
| 6,832,210 B1 * | 12/2004 | Li | 705/36 R |
| 2001/0032167 A1 * | 10/2001 | Tulloch et al. | 705/37 |
| 2001/0042037 A1 * | 11/2001 | Kam et al. | 705/36 |
| 2001/0049651 A1 * | 12/2001 | Selleck | 705/37 |
| 2002/0055901 A1 * | 5/2002 | Gianakouros et al. | 705/37 |
| 2002/0091606 A1 * | 7/2002 | Shapiro | 705/36 |
| 2004/0039675 A1 * | 2/2004 | Wallman | 705/36 |
| 2004/0044505 A1 * | 3/2004 | Horwitz | 703/3 |
| 2006/0047590 A1 * | 3/2006 | Anderson et al. | 705/35 |
| 2006/0184449 A1 * | 8/2006 | Eder | 705/38 |
| 2007/0061230 A1 * | 3/2007 | Kim-E | 705/35 |
| 2008/0052101 A1 * | 2/2008 | Ziade et al. | 705/1 |

FOREIGN PATENT DOCUMENTS

| | | | |
|---|---|---|---|
| WO | WO 94/06103 | * | 3/1994 |
| WO | WO 00/65510 | * | 11/2000 |
| WO | WO 02/098045 A2 | * | 12/2002 |

\* cited by examiner

FIG. 1

```
EXECUTION SELL  AGX    100
EXECUTION SELL  AAC    45600
EXECUTION SELL  CHV    200
EXECUTION SELL  CLF    40400
EXECUTION SELL  CSTR   7400
EXECUTION SELL  EDS    100
EXECUTION SELL  HET    44100
EXECUTION SELL  IMP    56920
EXECUTION SELL  JP     3600
EXECUTION SELL  LXK    100
EXECUTION SELL  MRX    25300
EXECUTION SELL  MPS    54900
                 •
                 •
                 •
EXECUTION BUY   AMFI   8200
EXECUTION BUY   ASBC   4800
EXECUTION BUY   BTH    10200
EXECUTION BUY   BOW    100
EXECUTION BUY   CHRX   19100
EXECUTION BUY   CVSN   28400
EXECUTION BUY   CINF   200
EXECUTION BUY   CRCL   5000
EXECUTION BUY   CDP    200
EXECUTION BUY   EVER   4400
EXECUTION BUY   FJ     7100
EXECUTION BUY   HAIN   4800
                 •
                 •
                 •
```

FIG. 2

Tlshaw2.rpt
D. E. Shaw Securities, L.P. Portfolio Bidding System (V6.7 09/01/1999 )

Today's date: 09/20/1999  Data file date: 08/31/1999

LIQUIDITY INDEX

Shaw Prices:  18.71   Your Prices:   47.96

PORTFOLIO SUMMARY

|        | Names | Shares    | Value ($)  |
|--------|-------|-----------|------------|
| Buys   | 65    | 657,600   | 14,371,156 |
| Sells  | 57    | 674,220   | 14,179,103 |
| Totals | 122   | 1,331,820 | 28,550,259 |

|                  | Buys  | Sells | Totals |
|------------------|-------|-------|--------|
| Average %ADV     | 26.4  | 44.5  | 35.4   |
| Median %ADV      | 2.0   | 0.9   | 1.5    |
| Stock Diversity  | 6.66  | 6.49  | 6.56   |
| Sector Diversity | 5.92  | 5.62  | 3.20   |
| Shaw Spread (cts)| 15.68 | 15.33 | 15.49  |
| Beta             | 12.6  | 13.6  | 0.7    |
| Return Mean      | -0.0  | 0.0   | 0.0    |
| Return Sigma     | 0.1   | 0.1   | 0.1    |
| Return VAR       | -0.2  | -0.3  | -0.2   |

IN THE S&P 500

|        | Names | Shares  | Value ($) |
|--------|-------|---------|-----------|
| Buys   | 20    | 174,000 | 4,691,856 |
| Sells  | 20    | 161,800 | 3,864,981 |
| Totals | 40    | 335,800 | 8,556,838 |

OTC POSITIONS

|      | Names | Shares  | Value ($) |
|------|-------|---------|-----------|
| Buys | 27    | 224,500 | 4,980,244 |

Page 1

FIG. 3A

|  |  | Tlshaw2.rpt |  |
|---|---|---|---|
| Sells | 17 | 79,400 | 1,638,066 |
| Totals | 44 | 303,900 | 6,618,309 |

LARGEST POSITION

| Exch | Shares | Value ($) |
|---|---|---|
| N | 77,200 | -1,558,475 |

REJECTED ASSETS SUMMARY

Number of rejected assets: 1
Number of pink sheets: 0

|  | Exch | Shares | Value ($) |
|---|---|---|---|
| Buy | L | 1,600 | ? |
| Totals |  | 1,600 | ? |

CLEANUP ANALYSIS

| # | Exch | Value ($) | New Index | Indiv Indx |
|---|---|---|---|---|
| 1 | O | 583,744 | 18.37 | 71.38 |
| 2 | O | -260,075 | 10.10 | 32.38 |
| 3 | N | -1,295,325 | 75.61 | 66.45 |
| 4 | O | 713,550 | 14.88 | 67.23 |
| 5 | O | 424,225 | 27.93 | 1.33 |

TRACKING ERROR

| # | Index | Buy Side | Sell Side | Total |
|---|---|---|---|---|
| 1 | S&P 500 | 17.28 % | 16.99 % | 15.33 % |
| 2 | S&P 400 Midcap | 12.97 % | 13.40 % | 10.81 % |
| 3 | Russell 2000 | 12.96 % | 14.21 % | 11.39 % |
| 4 | S&P 600 Smallcap | 12.28 % | 13.32 % | 10.42 % |
|  | Calculated on | 85.62 % | 97.64 % | 91.59 % |

D. E. Shaw Securities, L.P. does not guarantee the accuracy of these figures.

Page 2

FIG. 3B

| ACCT | TDATE | TICKER | SHARES | PRICE | BROKER | SIDE | GROSS | COMM | SEC | NET |
|---|---|---|---|---|---|---|---|---|---|---|
| Execution | 19990920 | AMFI | 8200 | 20.3438 | SHAW | COVER | 166819.2 | 984 | 0 | 167803.2 |
| Execution | 19990920 | ASBC | 4800 | 36.9063 | SHAW | COVER | 177150.2 | 576 | 0 | 177726.2 |
| Execution | 19990920 | BTH | 10200 | 31.3125 | SHAW | COVER | 319387.5 | 1224 | 0 | 320611.5 |
| Execution | 19990920 | BOW | 100 | 57.6875 | SHAW | COVER | 5768.75 | 12 | 0 | 5780.75 |
| ⋮ | | | | | | | | | | |
| Execution | 19990920 | AET | 600 | 74.375 | SHAW | BUY | 44625 | 72 | 0 | 44697 |
| Execution | 19990920 | AVS | 5600 | 18.6875 | SHAW | BUY | 104650 | 672 | 0 | 105322 |
| Execution | 19990920 | AVI | 9500 | 21.6875 | SHAW | BUY | 206031.3 | 1140 | 0 | 207171.3 |
| Execution | 19990920 | AZR | 22800 | 9.9375 | SHAW | BUY | 226575 | 2736 | 0 | 229311 |
| ⋮ | | | | | | | | | | |
| Execution | 19990920 | AGX | 100 | 47 | SHAW | SELL | 4700 | 12 | 0 | 4687.84 |
| Execution | 19990920 | AAC | 45600 | 4.8125 | SHAW | SELL | 219450 | 5472 | 0 | 213970.7 |
| Execution | 19990920 | CHV | 200 | 92.125 | SHAW | SELL | 18425 | 24 | 0 | 18400.38 |
| Execution | 19990920 | CLF | 40400 | 32 | SHAW | SELL | 1292800 | 4848 | 0 | 1287909 |
| ⋮ | | | | | | | | | | |
| Execution | 19990920 | ALKS | 300 | 33.3125 | SHAW | SHORT | 9993.75 | 36 | 0 | 9957.41 |
| Execution | 19990920 | APC | 400 | 33.8125 | SHAW | SHORT | 13525 | 48 | 0 | 13476.54 |
| Execution | 19990920 | ACAI | 700 | 19.375 | SHAW | SHORT | 13562.5 | 84 | 0 | 13478.04 |
| Execution | 19990920 | AZO | 900 | 27.75 | SHAW | SHORT | 24975 | 108 | 0 | 24866.16 |

METHOD AND APPARATUS FOR THE RECEIPT, COMBINATION, AND EVALUATION OF EQUITY PORTFOLIOS FOR EXECUTION BY A SPONSOR AT PASSIVELY DETERMINED PRICES

FIELD OF THE INVENTION

The present invention is directed to a system for the electronic trading of financial instruments, and in particular, a system and method for the receipt, combination, and evaluation of equity portfolios for possible simultaneous execution at passively determined prices by a sponsor.

BACKGROUND OF THE INVENTION

A portfolio trade (also known as a "basket trade") is the simultaneous execution of a large number of individual stock trades. Because there are often significant transaction-cost and other advantages to trading equities as baskets rather than as individual stocks, portfolio trading has in recent years become increasingly popular with sophisticated money managers (for example, pension funds and mutual funds) and other professional market participants who use it to fund, rebalance, or liquidate equity portfolios. As used herein, the terms "institutional investor" or "client" refer to any non-retail person or entity who wishes to make a portfolio trade.

In order to establish a context for discussing the transaction-cost advantages of portfolio trading, a brief overview of equity trading costs is appropriate. In general terms, the overall cost of trading can be divided into three components: commission, "slippage" (also called "market impact"), and opportunity cost. Although some traders mistakenly emphasize only the first of these costs, there are many trades for which slippage and opportunity cost substantially outweigh the more explicit cost of commissions. Since the overall cost of a trade can therefore vary widely even when the commission is fixed, it is impossible to minimize transaction costs without a detailed understanding of these three individual components.

Commission. The most obvious component of trading costs (along with other fixed costs, such as clearing), the commission is the charge per share that a broker-dealer receives in exchange for handling an order. The magnitude of a commission typically depends on a number of factors, including the size of the order involved, the amount of capital at risk (if any), and the provision of research and other services by the executing broker-dealer.

Slippage. Slippage, or market impact, is the price effect produced by trading. Stated simply, the price of a stock tends to move adversely when you trade it—buy orders normally push the price up and sell orders normally push the price down. This price slippage can be considerable, especially if an order is for a significant fraction of the total number of shares normally traded in a given stock over the course of a day.

Opportunity Cost. A portfolio manager normally generates buy or sell orders after coming to the conclusion that his portfolio will have a higher intrinsic return ("alpha"), or a more favorable risk profile, after executing the contemplated set of trades than before executing the trades. The longer the portfolio stands in its pre-trade execution state, the longer the fund manager sacrifices the higher expected alpha, or reduced risk, of the post-trade portfolio. The stronger the portfolio manager's views about the post-trade portfolio, the larger the expected opportunity cost if the required trading does not take place quickly.

Minimization of overall transaction costs therefore requires that an institutional investor have a detailed understanding of the slippage produced by its own trading. This is difficult for many institutional investors because slippage is a complex phenomenon for which many different measures are available. Similarly, in order to effectively minimize opportunity cost, the institutional investor must have the ability to quantify the relative importance of each individual trade—that is, determine when it is important to have some orders executed more quickly than others. Because institutional investors are generally more expert at evaluating companies and analyzing investments than at understanding market microstructure as it relates to slippage and other esoteric transaction cost dynamics, an increasingly popular solution for institutional investors is to offload the technical challenge of optimizing the implementation of their investment decisions by trading entire portfolios with broker-dealers who use their own specialized trading and transaction-cost expertise to handle these portfolios either as a principal or as an agent.

There are two basic kinds of portfolio trades: agency trades and principal trades. In an agency portfolio trade, an institutional investor asks an executing broker-dealer to use its trading expertise and market access to complete the portfolio trade (by executing all of the portfolio's component trades) on the most favorable terms possible. These trades are sometimes subject to instructions regarding position or dollar-value ratios that should be maintained as the portfolio is being traded. In an agency trade, the executing broker-dealer does not assume any principal risk—that is, the executing broker-dealer does not commit any of its own capital to buy or sell any portion of the portfolio for its own account. As a result, the commission the broker-dealer receives from the institutional investor for providing this service is typically quite low. The slippage and opportunity costs (which, in the case of agency portfolio trades, are borne wholly by the institutional investor), on the other hand, will vary from trade to trade, depending in part on the amount of time the institutional investor allows for the trade to occur. An institutional investor can establish a number of different "targets" for the average price at which the executing broker-dealer should attempt to trade the agency portfolio (and therefore its component trades). In some cases, this target may be as general as "get it done at the best price possible," but quite often, and especially in the case of index funds or funds driven by asset-allocation models, a more objective benchmark for the broker-dealer's performance is used. This benchmark might, for example, be linked to the day's volume-weighted average price, or the closing price, of the stocks being traded in the portfolio. Regardless of the target price the broker-dealer attempts to achieve, the institutional investor's portfolio in an agency trade is executed at the actual prices achieved by the executing broker-dealer. The executing broker-dealer is paid a previously agreed-upon per-share commission for acting as the agent handling the transaction.

In a principal portfolio trade, a broker-dealer commits its own capital to execute an institutional investor's entire portfolio as principal, effectively transferring the entire portfolio to the broker-dealer's own account. For example, an institutional investor re-balancing a portfolio might have a list of $50 million of equities to buy and a list of $50 million of equities to sell and desires to execute the trades with a broker-dealer as a principal portfolio trade. To do this, the broker-dealer would purchase from the client, for the broker-dealer's own account, all the stocks the institutional investor wished to sell and sell to the institutional investor all the stocks the institutional investor wished to buy, with all of the component trades occurring at passively determined prices. For example, individual trades for exchange-listed stocks in the portfolio might occur at their closing prices on the relevant primary exchange (the New York Stock Exchange—"NYSE", or the American Stock Exchange—"Amex"), and individual trades for over-the counter ("OTC") stocks might take place at the midpoint of their last National Best Bid and Offer ("NBBO") on Nasdaq.

Since all of the position risk (the risk associated with holding stock positions) in the case of a principal portfolio trade is transferred from the client to the broker-dealer, the commissions on these trades are usually higher than commissions for agency trades, where the broker-dealer assumes no risk. Because the institutional investor's slippage and opportunity costs are effectively reduced to zero, overall transaction costs are often lower for an institutional investor with a principal portfolio trade than they would be with other methods for trading the same portfolio of stocks. The amount of commission charged for this type of principal trade depends largely on the level and type of risk incurred by the broker-dealer. The portfolio risk factors the broker-dealer evaluates when determining its commission for a principal portfolio trade include: liquidity, stock diversity, industry-sector representation, ratio of Nasdaq to exchange-listed securities, average bid/ask spread, price volatility, and the portfolio's correlation with indexes such as the S&P 500.

Generally, an institutional investor wishing to conduct a principal portfolio trade will put the intended portfolio out "for bid" by broker-dealers who are in the business of committing their own capital to facilitate principal portfolio transactions. Because the amount of commission charged to execute a principal portfolio trade depends on the level and type of risk incurred by the broker-dealer, an institutional investor wishing to conduct a principal portfolio trade typically shares some information with potential broker-dealer counter-parties concerning the risk characteristics of the overall portfolio it intends to trade. However, the institutional investor shares this information without revealing to bidding broker-dealers the specific stocks or position sizes the institutional investor wishes to buy and sell, in order to prevent these broker-dealers from "front-running" the institutional investor's portfolio trade. Front-running is a proscribed practice in which a broker-dealer who is privy to confidential information regarding a client's current or future trading activity uses this information to make profitable trades for the broker-dealer's own account, ahead of the completion of the client's trades.

As described above, the portfolio risk factors normally evaluated by broker-dealers bidding for principal portfolio trades include, for example: size of the portfolio trade (both total number of shares and dollar value), liquidity, stock diversity, industry-sector representation, ratio of Nasdaq to exchange-listed securities, average bid/ask spread, price volatility, and the portfolio's correlation with indexes such as the S&P 500. To aid in this evaluation, quantitative analysis of characteristics of combinations of portfolios can be performed to analyze a total size in shares, a total dollar value, an average individual position size, a median individual position size, a size in shares of a largest individual position, a dollar value of said largest individual position, a total size as a percentage of average daily volume, an individual position sizes as a percentage of average daily volume, a correlation/tracking-error with major market indices, an average bid-ask spread, a breakdown by buy/sell orders, shares, and dollar value, a breakdown by industry group, a breakdown by listing exchange, a hard to borrow analysis of individual positions, risk calculations, a crossing with a sponsor's portfolio, a sponsor's proprietary price forecasts or other proprietary data or analyses for individual positions or for the combination as a whole, and volatility measures. In order to facilitate the evaluation of these risk factors, bidding broker-dealers often provide institutional clients with special software which allows the institutions to generate "portfolio risk reports." These portfolio risk reports summarize certain risk factors for the entire portfolio the institutional investor wishes to trade, without revealing any information about the individual trades (for example, stock symbols or individual trade sizes) the portfolio trade is composed of. These portfolio risk reports are then sent by institutional investors, either via fax or email, to bidding broker-dealers, who use the risk reports to calculate and/or otherwise prepare their principal bids. Because bidding broker-dealers have no specific information about the individual trades in the subject portfolio (and therefore cannot prepare their principal bids using such information), the portfolio risk report is intended to convey enough information about the portfolio as a whole to allow broker-dealers to prepare informed principal bids on a "blind" basis. By eliminating any concerns about front-running the client portfolio, this "blind bidding" protocol guarantees the integrity of the bidding process. After preparing their principal bids, broker-dealers independently submit their per-share commission (specified commission) bids to the institutional investor. Each bid represents the per-share commission for which the submitting broker-dealer is willing to execute the entire principal portfolio trade at market-closing prices. Because all bidding broker-dealers would provide exactly the same execution for the principal portfolio trade (that is, the portfolio's component trades would be executed in full at the same passively determined prices regardless of which broker-dealer actually wins the trade), the institutional investor normally awards the portfolio trade to the broker-dealer submitting the lowest bid. Although the winning broker-dealer is notified immediately (during normal trading hours) that it has won the portfolio trade, the actual positions in the portfolio (that is, the portfolio's component trades, including specific stock symbols and trade sizes) are not divulged to the broker-dealer until after the close of trading on that day. Brokers profit from these transactions when the subsequent cost of liquidating the purchased portfolio is lower than the commission received from the institutional investor.

Unfortunately, the current system for requesting and calculating bids on individual principal portfolio trades is inefficient because it does not allow any bidding broker-dealer to aggregate, analyze, and bid on multiple portfolio trades simultaneously in search of trading synergies which would reduce its risk, thereby making it possible to lower the commissions it charges institutional investors for such trades. Therefore, what is needed is a system and method for the enhanced electronic trading of principal portfolio trades that automatically aggregates multiple portfolio trades, analyzes the risk characteristics of all possible combinations of these portfolio trades, and, without increasing the disclosure of trade information by institutions, will make it possible for a bidding broker-dealer to bid more competitively on multiple portfolio trades simultaneously than it could bid on the same portfolio trades evaluated individually.

SUMMARY OF THE INVENTION

The present invention is directed to an electronic portfolio trading system (the "System"), which can be operationally integrated within the principal trading desk of a broker-dealer sponsor (the "Sponsor"), which will aggregate intended principal portfolio trades submitted by institutional investors ("clients") who commit to trade their portfolios with the Sponsor (at the Sponsor's sole discretion) at client-specified, per-share commission rates. The System makes it possible for the Sponsor to effectively "bid" more aggressively (that is, charge lower commissions) for some portfolios by automatically identifying portfolio combinations whose combined risk profile is more favorable than the aggregated risk profile of the same component portfolios evaluated individually. The ability to bid more competitively on certain portfolio combinations is primarily the result of position crossing and diversification synergies, which would not exist if the same portfolios were evaluated individually.

DETAILED DESCRIPTION

The embodiments of the present invention are described below in the context of trading equity securities. However, the invention is not so limited and the contemplated embodiments allow the trading of other liquid assets such as options, bonds, and other securities. Accordingly, where the context permits, the terms "securities," "stock," and "shares" when used herein includes other instruments that can be traded, such as, for example, options and bonds. The terms "buy" and "sell" include, where appropriate, bid and offer, cover and short, etc. Similarly, embodiments of the present invention include systems for the aggregation and simultaneous analysis and trading of multiple portfolios by one or more broker-dealers, regardless of the frequency with which such trades occur, and regardless of whether the commission rates at which the portfolio trades are executed are specified by the institutional clients themselves or are otherwise determined.

In accordance with an embodiment of the present invention, an electronic portfolio trading system (the "System"), which can be operationally integrated within a principal trading desk of a broker-dealer sponsor (the "Sponsor") can aggregate intended principal portfolio trades submitted by institutional investors ("clients") who commit to trade their portfolios with the Sponsor (at the Sponsor's sole discretion) at client-specified, per-share commission rates. The System makes it possible for the Sponsor to effectively "bid" more aggressively (that is, charge lower commissions) for some portfolios by automatically identifying portfolio combinations whose combined risk profile is more favorable than the aggregated risk profile of the same component portfolios evaluated individually. The ability to bid more competitively on certain portfolio combinations is primarily the result of position crossing and diversification synergies, which would not exist if the same portfolios were evaluated individually.

In accordance with an embodiment of the present invention, the System receives from institutional clients, once per day: (1) each client's intended principal portfolio trade ("submitted portfolio"), and (2) the per-share commission price ("specified commission") at which each client is willing to commit to the principal execution of its submitted portfolio at market-closing prices by the Sponsor. Without revealing to the Sponsor (or to any other market participant) the specific positions in any submitted portfolio, the System, which incorporates the Sponsor's proprietary portfolio-bidding and risk analysis software, can automatically evaluate the risk characteristics of all possible combinations of submitted portfolios. If this analysis indicates that there is a combination of submitted portfolios which could be simultaneously executed by the Sponsor at their client-specified commission rates ("combined portfolio"), the System can automatically generate a portfolio risk report for the combined portfolio along with a recommendation to execute the combined portfolio and transmit this report and recommendation to the Sponsor for final review and approval. Even when this analysis fails to result in a recommendation to execute a combined portfolio, the System can still generate a portfolio risk report for the most "attractive" combined portfolio and transmits this to the Sponsor for confirmation of rejection or, in rare cases, possible override. The trades that make up a portfolio trade are referred to as "component trades." Similarly, the submitted portfolios which make up a combined portfolio are referred to as "component portfolios." If the Sponsor agrees to trade the combined portfolio proposed by the System at the weighted average institutional investor-specified commission rate implied by the component portfolios, the System can immediately inform the institutional investors having submitted the component portfolios that their portfolio trades have been accepted for principal execution by the Sponsor at market-closing prices for their specified commissions. Clients having submitted portfolios to the System that were not chosen for aggregation and execution by the Sponsor can be simultaneously notified that their submitted portfolios will not be executed by the System. The "weighted average" commission rate can be calculated by determining what percentage of the total shares in the combined portfolio each component portfolio contributes, multiplying each percentage by the institutional investor-specified commission rate for its associated component portfolio, and then adding the results. For example, in a combined portfolio that is made up of the following three component portfolios submitted by clients A, B, and C: client A's portfolio contains 600,000 shares at a commission rate of $0.11 per share, client B's portfolio contains 300,000 shares at a commission rate of $0.12 per share, and client C's portfolio contains 100,000 shares at a commission rate of $0.14 per share. In this case, the weighted average commission rate would be calculated as follows: [(600,000*0.11)+(300,000*0.12)+(100,000*0.14)]/(600,000+300,000+100,000), or $0.116 per share.

In accordance with an embodiment of the present invention, the present invention is intended to embrace any network or system that would permit broker-dealers to bid more competitively than would otherwise be possible for principal portfolio trades by realizing the crossing, diversification, and other synergies associated with the simultaneous analysis and/or trading of multiple portfolios. Therefore, the present invention is not limited to a system operated by a single Sponsor which analyzes and/or trades equity principal portfolio trades once per day at client-specified commission rates. Other embodiments of the present invention are applicable to any system or facility for the aggregation and simultaneous analysis and/or principal trading at passively determined prices of multiple portfolios of any type of security (for example, options, bonds, futures, etc.) regardless of: (1) whether one or more broker-dealers act as System Sponsor (s); (2) the frequency with which System trades occur; (3) whether the commission rates at which portfolio trades are executed are specified by System clients, specified by the Sponsor (requiring subsequent acceptance by System clients), specified automatically by the System (requiring subsequent acceptance by System clients), negotiated interactively through the System, or are otherwise determined; (4) whether the Sponsor's own portfolio is included in the analysis and/or trading process which also includes one or more client portfolios; and (5) whether client portfolios are executed in full, or whether a partial portfolio execution is negotiated through the System. It is important to note that if the Sponsor proposes the partial execution of a submitted portfolio which a client has already committed to trading in full, the client must explicitly accept or approve the Sponsor-proposed partial execution before such a partial execution would be permitted. Alternatively, in another embodiment, the client could submit additional information detailing subsets of the submitted portfolio and related commission rates that the client had committed to trade as a partial execution. In another embodiment of the present invention, the System permits clients to submit "portfolios" containing as few as one intended security trade.

Embodiments of the present invention are expected to be highly attractive to potential System clients and Sponsors. In an embodiment of the present invention where only a single Sponsor deploys the System to provide portfolio trading services to clients, the Sponsor would enjoy the following advantages:

By utilizing the System to bid for principal portfolio trades more aggressively than would otherwise be possible, the System Sponsor would expect to win more trades, thereby increasing traded volume, commission revenue, and market share in the principal portfolio trading arena.

Because the System makes it possible for the Sponsor to improve the average risk characteristics of acquired portfolios, and because only a portion of the associated savings will be effectively passed on to clients in the form of reduced commissions, the System Sponsor will benefit from the more favorable risk profile of acquired positions.

Automation of the portfolio aggregation, analysis, and bidding process will allow the System Sponsor to realize significant time and resource savings as compared to existing portfolio trading methodologies.

Similarly, in embodiments of the present invention, the clients would enjoy the following advantages:

Because the System will allow clients to designate their own commission rates for principal portfolio trades, and because the System can make it possible for the Sponsor to bid more aggressively for client portfolios, clients will enjoy greater flexibility and incur lower transaction costs, for trades made through the System rather than through traditional means.

By making it possible for the Sponsor to reduce the Sponsor's level of risk through the acquisition of combined portfolios, the System can enable the Sponsor to acquire larger portfolios than would otherwise be possible using current methods and systems, thereby increasing the amount of liquidity available to clients.

In an embodiment of the present invention the users of the system are typically professional investors, such as institutional investors—for example, pension funds, mutual funds, etc.—but may also be others who deal in or trade securities.

In an embodiment of the present invention, this entire process, from the upload of client portfolios and commissions to final notification that the Sponsor has committed to trading the combined portfolio or declined to trade other submitted portfolios, takes only a few minutes. For example, in accordance with an embodiment of the present invention, clients required to upload their portfolios and commission information by 3:00 pm might be notified as to whether or not their portfolio is accepted by the Sponsor for execution on the System by 3:05 pm. In keeping with standard principal portfolio trading practice, the actual positions in component portfolios are divulged to the Sponsor only after the close of trading on that day. Each component portfolio is executed at market-closing prices and adjusted by the client-specified commission.

The present invention is expected to be very attractive to institutional clients who conduct principal portfolio trades, as it is designed to facilitate the execution of the institutional client's portfolio trades at lower per-share commissions than would otherwise have been possible, thereby reducing overall transaction costs. In practice, institutional clients are expected to submit their portfolios to the System after they have gathered principal bids from broker-dealers in the traditional manner. For example, an institutional investor might put its portfolio out "for bid" by four broker-dealers, such as, broker-dealers A, B, C, and D. After evaluating the overall risk characteristics of the portfolio, broker-dealer A might submit a bid of 12.5 cents per share, broker-dealer B a bid of 13 cents per share, broker-dealer C a bid of 15 cents per share, and broker-dealer D a bid of 12 cents per share. Since all four broker-dealers are offering exactly the same execution, that is, a full execution of the portfolio at market-closing prices, the institutional client in question would normally inform broker-dealer D, the low bidder, that broker-dealer D had won the principal portfolio trade.

In an embodiment of the present invention, the institutional investor, after having gathered the above four bids in the traditional manner, can upload the portfolio into the System and indicate that it is willing to commit to a trade with the Sponsor at a commission rate of, for example, 11 cents per share. In just a few minutes, the institutional investor can be notified through the System whether the Sponsor (who would likely also be among the broker-dealers bidding for the portfolio traditionally) is willing to execute the institutional investor's portfolio trade as part of a combined trade for 11 cents per share. If the Sponsor is willing, the institutional investor will save one cent per share in commission for the entire portfolio. If not, the institutional investor grants the trade to broker-dealer D, the previous low bidder on the portfolio. At worst, therefore, use of the System would result in no change to the outcome of the traditional principal portfolio trade bidding process. At best, an institutional client would realize significant transaction cost savings by trading the institutional client's portfolio at a lower (self-specified) commission than would otherwise have been possible. Similarly, the Sponsor benefits from the more favorable risk characteristics of the combined portfolio by being able to bid more aggressively, thus increasing the Sponsor's chances of winning component portfolio trades in the combined portfolio that the Sponsor might not otherwise have won.

In an embodiment of the present invention, the System would, in addition to analyzing the risk characteristics of all possible combinations of client portfolios, automatically incorporate information regarding the Sponsor's existing portfolio of stock positions in the course of evaluating combined trades for bid. Using the Sponsor's existing portfolio of stock positions can occur regardless of whether only one or multiple client portfolios are submitted.

Figure 1:
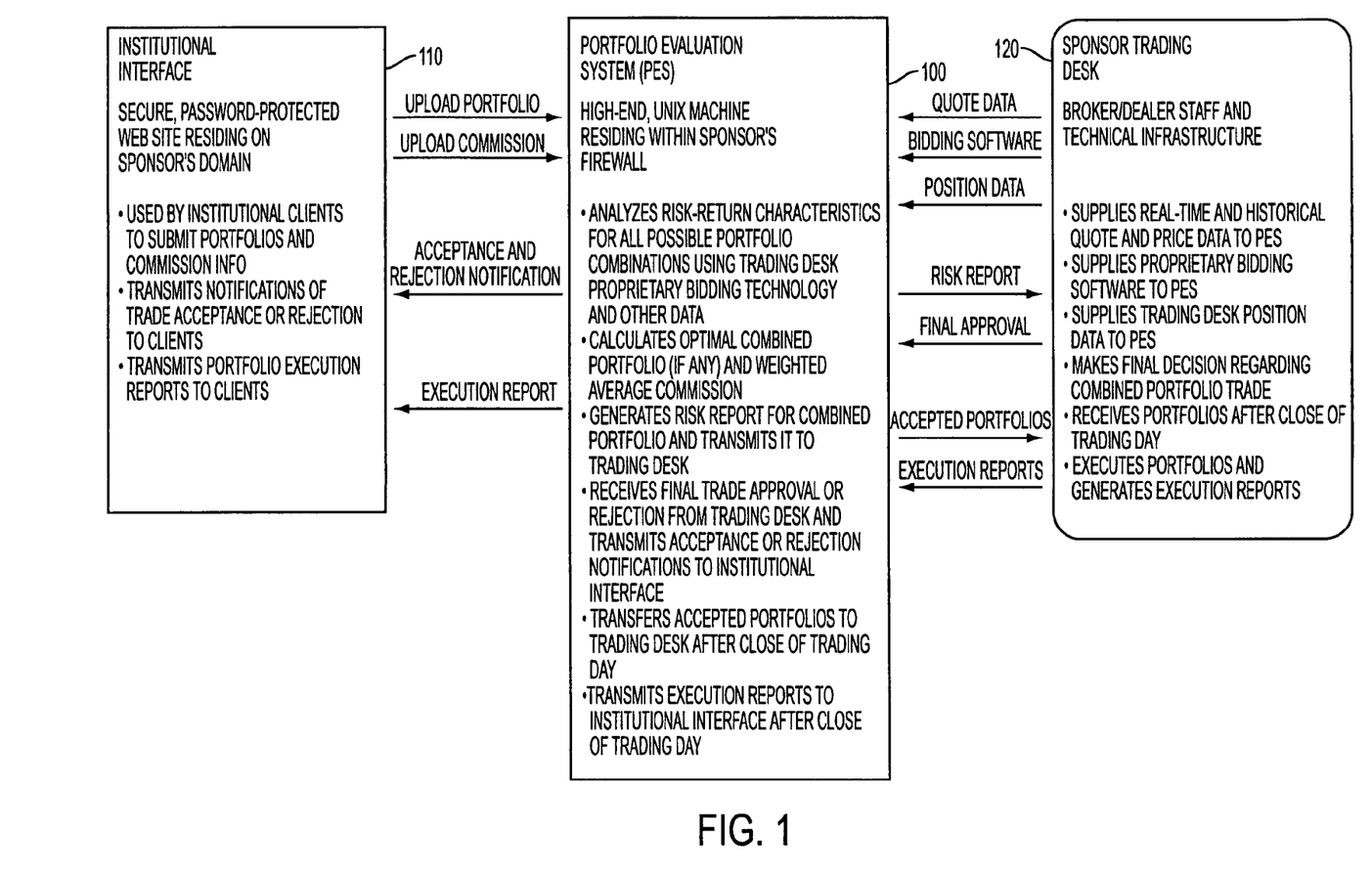
FIG. 1 illustrates a system block diagram of an embodiment of the overall architecture of the portfolio trading system in accordance with the present invention.

Referring now to the drawings, there is illustrated in FIG. 1 a block diagram of an embodiment of the overall architecture of the portfolio trading system in accordance with the present invention. In an embodiment of the present invention, institutional client can upload portfolios and commission information to a Portfolio Evaluation System ("PES") 100 via, for example, an Internet-based Institutional Interface 110. Although a Sponsor Trading Desk 120 is generally run on a machine maintained by the Sponsor and connected to the Sponsor's computer network, the PES 100 can be configured so that, in the normal course of business, it is impossible for the Sponsor to view the portfolio and commission information uploaded by the institutional clients. Using portfolio and commission data gathered from clients, along with quote/price data, risk-analysis software, and other proprietary analysis tools supplied and maintained by the Sponsor trading desk 120, the PES 100 can evaluate all possible combinations of portfolios uploaded to the System. If there are one or more portfolio combinations whose aggregated risk characteristics appear to be sufficiently favorable to allow the Sponsor to trade the component portfolios as principal at the institutional client-specified commission rates, the System can automatically generate a portfolio risk report for the most attractive combined portfolio. The risk report can also indicate the weighted-average per-share commission for the combined portfolio and can be automatically transmitted to the Sponsor for final review. The Sponsor's management and/or trading staff either approve or decline to trade the combined portfolio at the specified commission. If approved, the PES 100 can immediately communicate through the Institutional Interface the Sponsor's trade commitment to only those institutional clients who submitted the component portfolios which were included in the accepted combined portfolio. Likewise, the other institutional clients can be automatically notified that their portfolio trades have been declined. Similarly, when the PES 100 fails to propose any combined portfolio trade, or where the Sponsor Trading Desk 120 declines a combined portfolio trade proposed by the PES 100, all clients can be immediately be notified through the Institutional Interface that their portfolio trades have been declined. In the case of approved combined portfolio trades, the PES 100 forwards the actual position files for component portfolios after the close of trading to the Sponsor, generally, the Sponsor Trading Desk 120. The Sponsor can then transmit execution reports for these portfolios from the trading desk to the corresponding clients.

In an embodiment of the present invention, the Institutional Interface 110 can be is used to enter, modify, and cancel portfolio and commission information, and serve as the mechanism used by the System to communicate trade execution and other information to institutional clients. Possible business arrangements with other trading systems, data providers, and technology vendors may permit third-party terminals or electronic interfaces to be used by the institutional clients to communicate with the System. Portfolios and commission information entered into the System by institutional clients are, in general, completely invisible to all other System clients and market participants. These portfolios, generally, are invisible to other market participants, that is, the portfolios from one client can not be displayed on any screen, terminal, or quotation, or otherwise communicated to any other client, person or entity. However, each institutional client is able to view its own portfolio and commission information on the System. Similarly, in the normal course of business, while the contents of the submitted portfolio and commission information for each client will be completely invisible and inaccessible to the principals, employees, and associated persons of the Sponsor, the source of each portfolio is visible.

In another embodiment of the present invention, the Sponsor staff approval or rejection of the combined portfolio trades can be automated using, for example, an artificial intelligence ("AI") approval program (not shown) which can reside at either the PES 100 or the Sponsor Trading Desk 120 to permit Sponsor staff monitoring. The AI approval program can be trained by the Sponsor staff to approve or reject trades based on the same criteria used by the Sponsor staff. Additionally, in embodiments of the present invention, the AI approval program can be configured to transmit some or all approved trades to the Sponsor staff for review and potential override. However, if the approval is not overridden within a specified time period, the System can be configured to automatically notify the institutional clients that their trades have been accepted. Likewise, some or all rejected trades can be routed to the Sponsor staff for review and potential override. In these embodiments, a variety of threshold values can be set to determine which trades are routed to the Sponsor staff. For example, these threshold values can include, but are not limited to, a maximum dollar value of the portfolio trade, a maximum commission rate, the risk factors, the total number of shares of the combined trade, and the number of different securities in each portfolio. The contemplated embodiments vary from partial automation, where the Sponsor staff can still approve or reject each proposed trade, to a fully automated system where the PES 100 and the AI approval program perform all of the analysis and make all of the decisions. The level of automation that can be implemented in each embodiment is variable depending on how confident the Sponsor's management and staff are with the decision-making ability of the AI approval program. In fact, the level of implementation of the AI approval program can be configured to fit individual Sponsor staff preferences and selection criteria.

Figure 2:
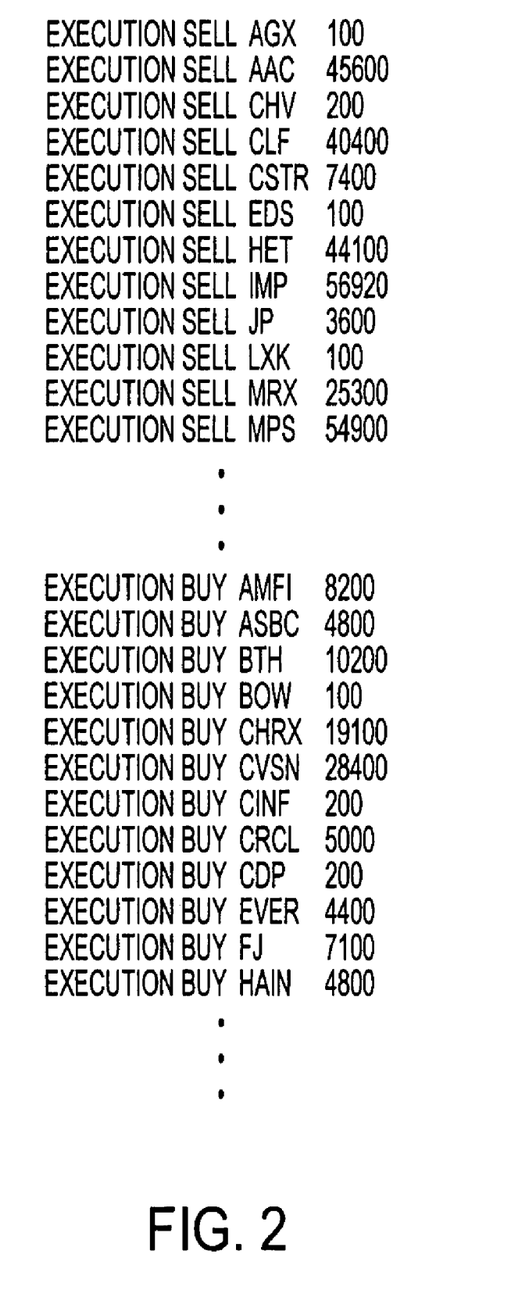
FIG. 2 illustrates a portion of a sample principal portfolio trade which can be uploaded to the System by an institutional investor.

There is illustrated in FIG. 2 a portion of a sample portfolio trade that can be uploaded to the System by an institutional client. The first column shows a fictive account name, in this case, "Execution". The second column shows the side, that is, buy or sell, of each component trade. The third column shows the ticker symbol for each component trade. The last column shows the number of shares for each component trade.

Figure 3A:
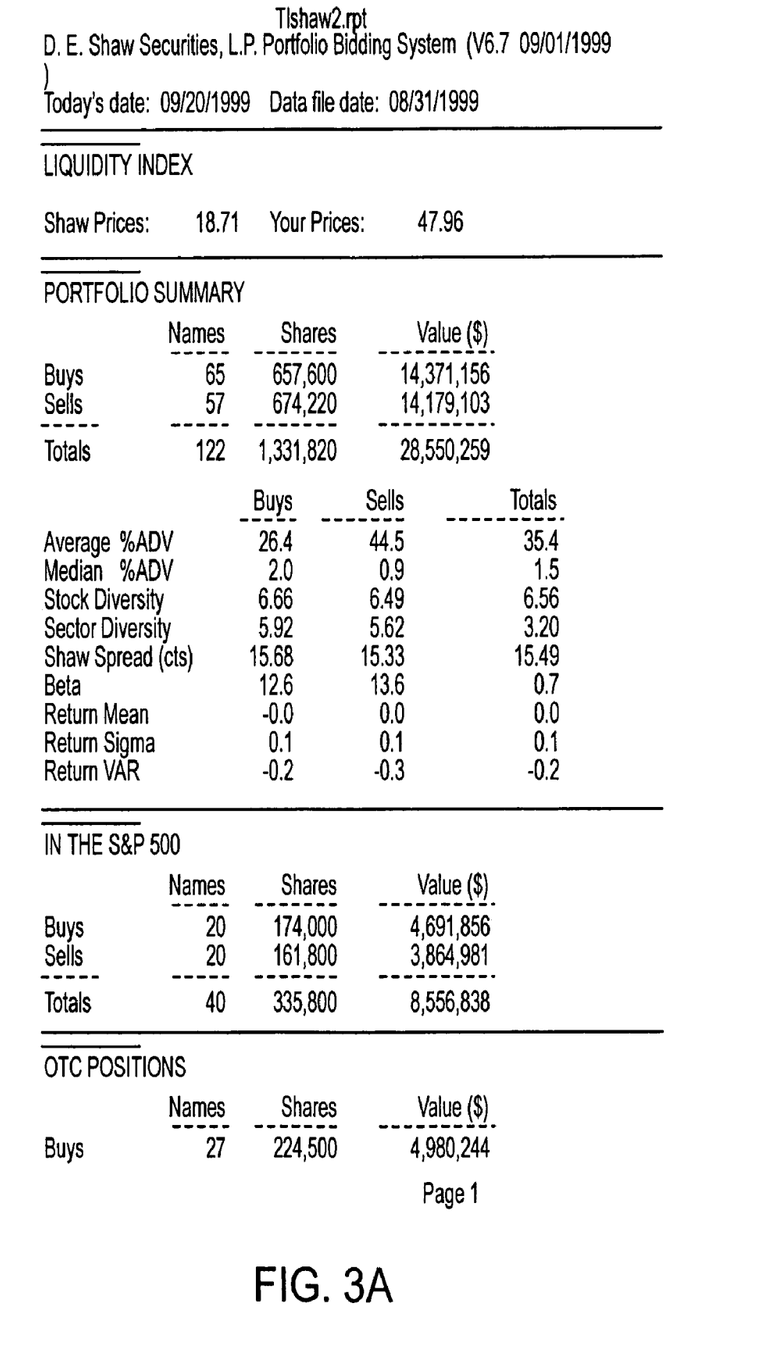
FIG. 3 illustrates a portion of a sample format of a portfolio risk report describing the sample portfolio trade in FIG. 2.
Figure 3B:
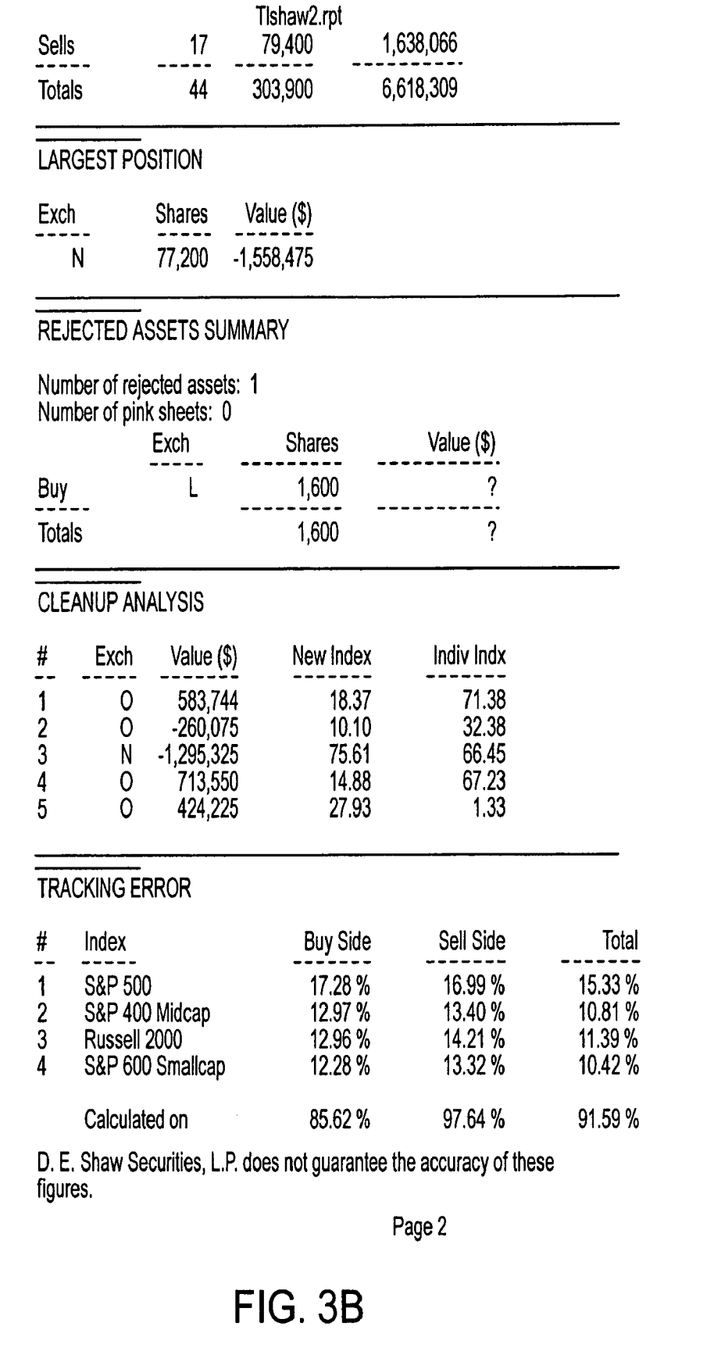

FIG. 3 illustrates a portion of a sample format of a portfolio risk report that describes the sample portfolio trade in FIG. 2. Although the sample risk report in FIG. 3 describes only a single principal portfolio trade, it is similar in nature to a portfolio risk report which would be generated by the PES 100 for the combined portfolios in embodiments of the present invention. Specifically, the Sponsor's Trading Desk 120 is unable to determine, by reviewing the portfolio bidding report for a combined portfolio generated by the PES 100, the number or composition of component portfolios, their associated commission rates, or their source, that is, which institutional investors have submitted them. The portfolio risk report can include a variety of information describing the risk characteristics of the portfolio as a whole, and can be reviewed by the Sponsor's trading staff to facilitate final approval of the trade. As discussed above, alternate embodiments can include an automated portfolio trade approval process.

Figure 4:
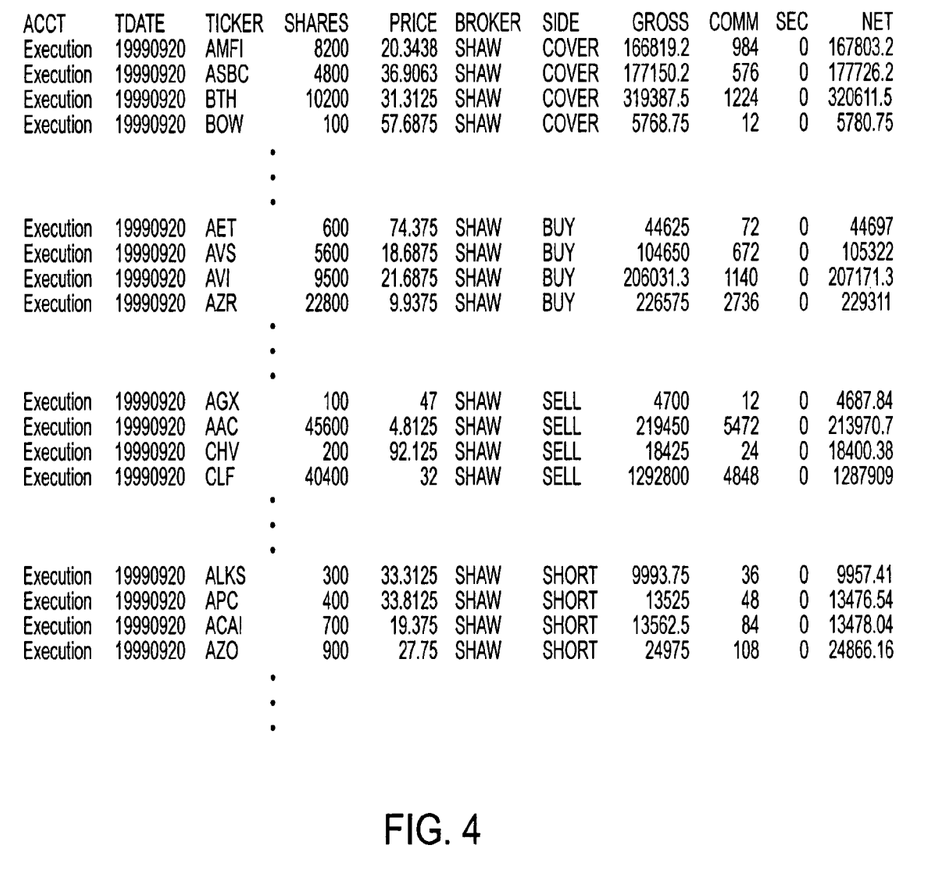
FIG. 4 illustrates a portion of a sample format of an execution report for the sample principal portfolio trade shown in FIG. 2.

There is illustrated in FIG. 4 a portion of a sample format of an execution report for the single principal portfolio trade illustrated in FIG. 2. As stated above, the actual stock trades making up the component portfolios of an approved combined portfolio can be transmitted to the Sponsor only after the close of trading on the day of the trade. Currently, the close of trading is 4:00 pm, Monday through Friday, on the NYSE, Amex, and Nasdaq markets. After receiving the actual information, each component portfolio can be executed by the Sponsor at market-closing prices and adjusted by the client-specified commission. FIG. 4, therefore, illustrates the type of execution report that is sent through the Institutional Interface 110 to clients having submitted the component portfolios making up the executed combined portfolio.

Figure 5:
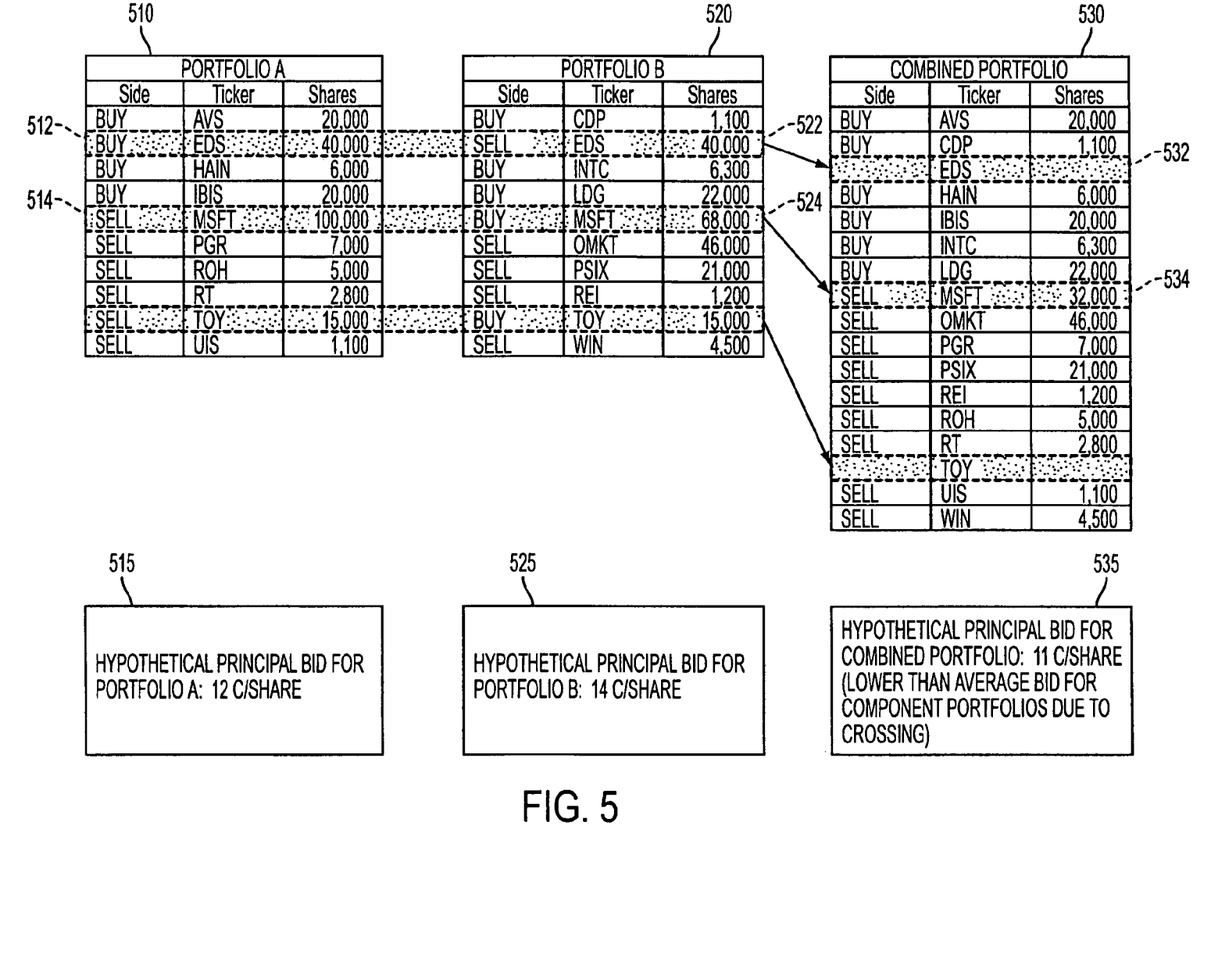
FIG. 5 illustrates an example of how a combined portfolio might have more favorable risk characteristics than its component portfolios evaluated individually.

FIG. 5 is a diagram illustrating how a combined portfolio may have substantially more favorable risk characteristics than when the component portfolios of the combined portfolio are evaluated separately. Although FIG. 5 simply illustrates the risk-reduction benefits of portfolio combination which result specifically from crossing stock trades among component portfolios, it should be noted that aggregating component portfolios into a combined portfolio also increases diversification, which serves to decrease certain types of risk. "Crossing stock" trades occur when an individual stock trade from one component portfolio in a combined portfolio trade either partially or totally satisfies another individual stock trade from another component portfolio in the same combined portfolio trade. In FIG. 5, a Portfolio A 510 and a Portfolio B 520 are shown with multiple component trades, each specifying a trading side, a ticker symbol of a stock to be traded and the number of shares of the stock to be traded. Associated with Portfolio A 510 can be a Portfolio A principal bid 515 that a Sponsor would charge to execute only the Portfolio A 510 component trades. Similarly, associated with Portfolio B 520 can be a Portfolio B principal bid 525 that a Sponsor would charge to execute only the Portfolio B 520 component trades. Also, in FIG. 5, a Combined Portfolio 530 shows the combined Portfolio A 510 and Portfolio B 520 component trades and a Combined Portfolio principal bid 535 that a Sponsor would charge to execute the Combined Portfolio 530 component trades. In general, the Combined Portfolio principal bid 535 will be lower than the average bid for the component portfolios of the Combined Portfolio 530, that is, Portfolio A 510 and Portfolio B 520. For example, in FIG. 5, Portfolio A 510 has a BUY order 512 for 40,000 shares of a stock represented by the symbol EDS and Portfolio B 520 has an opposite trading side SELL order 522 for 40,000 shares of EDS, which results in no position in the Combined Portfolio. Thus, in this crossing stock trade, since the BUY and SELL orders 512 and 522, respectively, are equal in size, both are completely satisfied when Portfolios A and B 510 and 520, respectively, are combined. The combined portfolio 530 reflects no net position 532 in EDS remaining to be executed. Similarly, in FIG. 5, Portfolio A 510 has a SELL order 514 for 100,000 shares of a stock represented by the symbol MSFT and Portfolio B 520 has an opposite trading side BUY order 524 for 68,000 shares of MSFT, which results in a remaining SELL position of 32,000 shares of MSFT in the Combined Portfolio. Thus, in this crossing stock trade, since the BUY and SELL orders 514 and 524, respectively, are not equal in size, only the BUY order of Portfolio B 520 is completely satisfied when Portfolios A and B 510 and 520, respectively, are combined. The combined portfolio 530 reflects a net SELL order 534 position of 32,000 shares in MSFT remaining to be executed.

The crossing stock trades, in FIG. 5, represent one of the factors that helps to reduce the Sponsor's overall risk in a combined portfolio trade. This reduced risk results in the Sponsor's ability to bid more competitively for the combined portfolio trade than the Sponsor would have bid for the component portfolio trades evaluated separately. It should be noted, of course, that the BUY and SELL orders, for example, in EDS are executed by the Sponsor, but the execution of these two orders is effectively riskless to the Sponsor because these executions do not result in any net principal position for the Sponsor.

Figure 6:
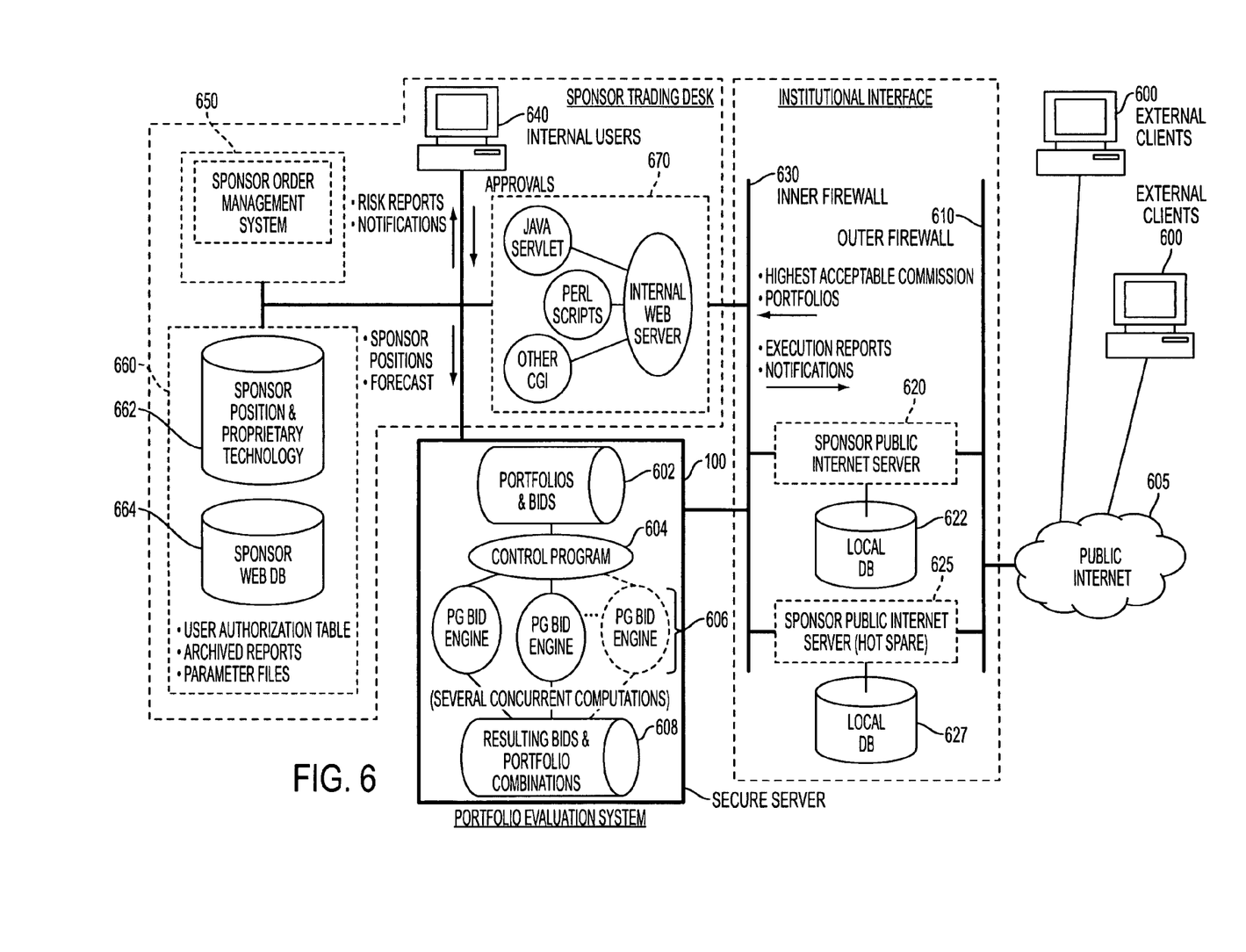
FIG. 6 is a system diagram of an embodiment of the present invention detailing individual software and other technology sub-components in the system.

FIG. 6 illustrates an embodiment of the present invention integrated into a technical infrastructure of the Sponsor broker-dealer. As shown in FIG. 6, the PES 100 is implemented on a secure server that is located behind "firewalls" at the Sponsor's Web site. The firewalls restrict access to the site to authorized entities and interact with the Institutional Interface. In FIG. 6, external clients 600 are coupled to public Internet 605, which is in turn coupled to an outer firewall 610, which is in turn coupled to and controls access to a Sponsor Public Internet server 620. The Sponsor Public Internet server 620 is coupled to a local storage 622 including a local database. While not required in embodiments of the present invention, a Sponsor Public Internet server (Hot Spare) 625 is coupled to a local storage 627, the outer firewall 610 and the inner firewall 630. The Sponsor Public Internet server (Hot Spare) 625 is, generally, configured to mirror and backup the Sponsor Public Internet server 620 operation and data. Inner firewall 630 is further coupled to an internal web server 670 and the PES 100. The internal web server 670 and the PES 100 are coupled to each other and also coupled to a sponsor trading desk 640, a sponsor order management system 650 and multiple related sponsor databases 660. The related sponsor database can include, for example, a sponsor position and proprietary technology database 662 and a sponsor web database 664.

The PES 100 can be implemented on a single computer or a networked set of computer systems, which could be either server platforms or workstations using standard personal computer (PC) technology. For example, a computer hosting a software application that comprises the PES 100 may be a Sun® dual-processor UltraSPARC™-II-based server operating at 450 MHz and with 512 to 4096 MegaBytes (MB) of random access memory (RAM); a mass memory storage unit, such as a floppy disk, a zip disk, a DVD disk, a hard disk drive, a rewritable optical disk, a flash memory and other components.

In another embodiment of the present invention, the computer hosting the software application that comprises a piece of the PES 100 may be an Intel® Pentium®-based PC operating at 500 MHz and with 128 to 512 MegaBytes (MB) of random access memory (RAM); a mass memory storage unit, such as a hard disk drive; and sufficient communication capabilities to connect the PES 100 to each of the individual investors 600 and other components shown in FIG. 6.

An incoming portfolio, which can include client-specified commission information, from one of the external clients 600 is inspected by the Outer Firewall 610 to determine if it is from a valid external client 600 before the incoming portfolio can proceed to the Sponsor's "public" Internet server 620. If the portfolio is from a valid external client machine, the portfolio can proceed to the Sponsor's "public" Internet server 620, where it is reformatted so that it can be understood by the PES 100. The resulting reformatted information then passes through the Inner Firewall 630, which further protects the Sponsor's internal systems by verifying that only valid messages from the Sponsor's public web server 620 can pass through, to the PES 100.

The PES 100 is linked internally to the Sponsor's Trading Desk 640, Order Management System 650, and related databases 660, and to the internal Web server 670 that controls the secure Web site and governs access to this site. The PES 100 is also linked externally through firewall 630 to the "public" portion of the Sponsor's Web site located on public Web server 620 as well as to the public Internet 605 in order to allow communication with institutional clients. Institutional clients can connect to the PES 100 through the public Internet 605 using the Institutional Interface, which consists of the Sponsor's public web server 620 and protecting firewalls 610 and 630.

The PES 100, in FIG. 6, includes a portfolio and bid storage component 602 coupled to a control program component 604, which is coupled to one or more bid engines 606, which are in turn coupled to a resulting bid and portfolio combinations component 608. The portfolio and bid storage component 602 can be configured to receive and store incoming client portfolio trades and the associated client specified commission rates each client is will to pay to execute that portfolio trade.

Figure 7:
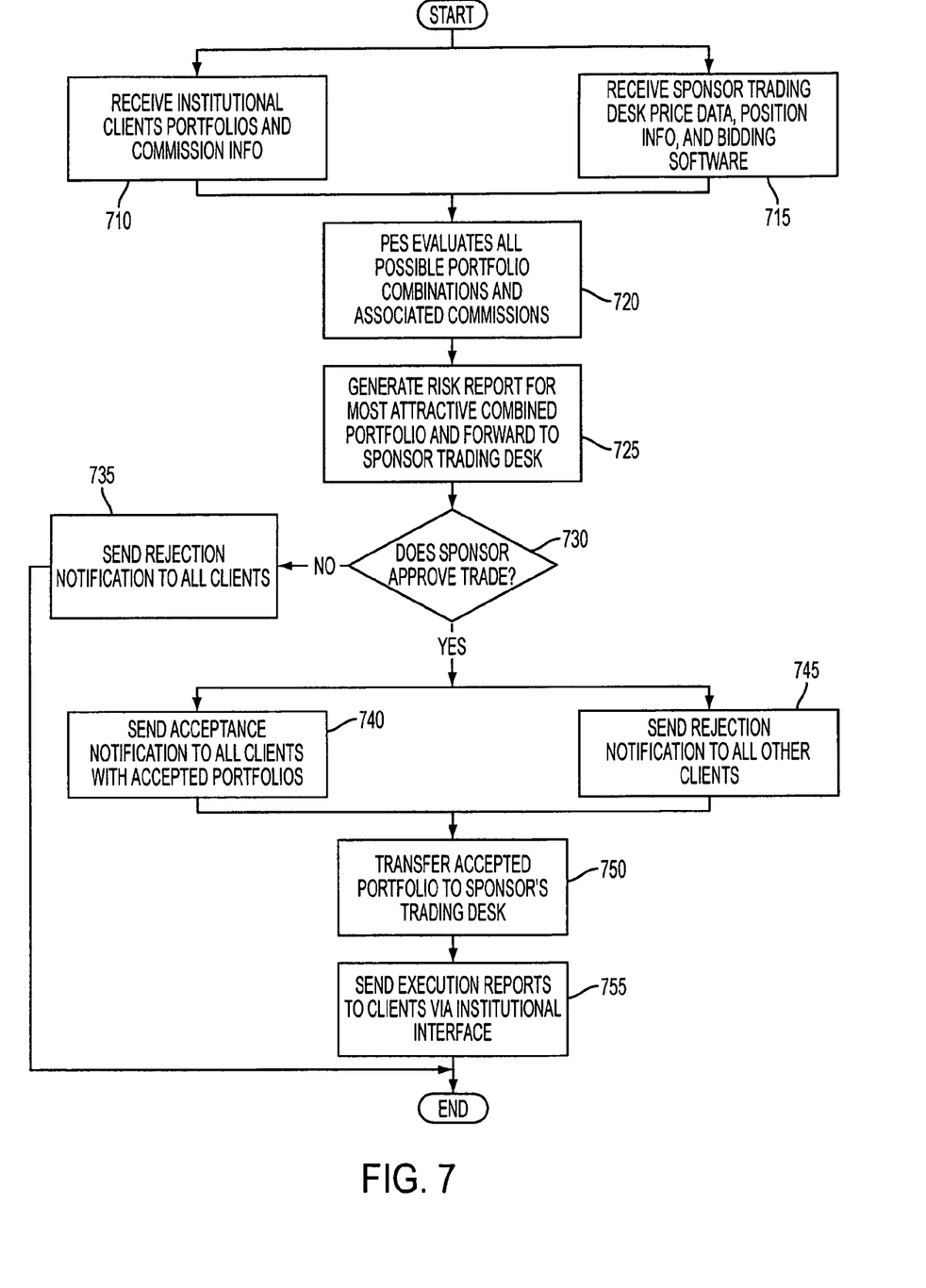
FIG. 7 is a flow chart diagram illustrating the trading process for submitted portfolios in the representative embodiment.

FIG. 7 is a flowchart that describes the method in an embodiment of the present invention by which principal portfolio trades are submitted and executed. Although a variety of passively determined execution-price protocols are possible, in the representative embodiment, all approved portfolio trades are executed at market-closing prices. The Sponsor generates proprietary revenue by collecting client-specified per-share commissions from institutional clients whose portfolio trades are executed through the System. Because the Sponsor serves as counter-party for every portfolio trade executed through the System, the anonymity of institutional clients will be preserved throughout the clearance and settlement process.

In FIG. 7, the System receives 710 one or more institutional client intended portfolio trades as well as the commission payable to the Sponsor for which each client is willing to commit to the total execution of each portfolio trade, that is, the complete execution of each component trade in the portfolio trade. Similarly, the System receives 715 Sponsor price data, Sponsor portfolio information and other Sponsor information, either before, concurrent with, or after the System receives 710 one or more institutional client intended portfolio trades. The PES then, evaluates 720 all possible combinations of submitted client portfolio trades (and their associated commissions) to determine whether there are any combinations of these portfolios which might represent an attractive trading opportunity for the Sponsor. In block 725, the System automatically generates a combined portfolio risk report for the most attractive of these combinations and transmits this report to the Sponsor Trading Desk for approval or rejection by the Sponsor management or staff. In block 730, a check is made to determine if the Sponsor staff approves a trade for the most attractive combined portfolio submitted by the System. If the trade is not approved, flow continues with block 735 where the System can automatically transmits a rejection notification to all institutional clients which have submitted portfolio trades and then the System shuts down. If a trade is approved, flow continues with block 740, where the System automatically transmits acceptance notifications to the institutional clients whose portfolios were included in the approved combined portfolio and, concurrently, with block 745, where the System automatically transmits rejection notifications to those institutional clients whose portfolio trades were rejected, that is, not included in the approved combined portfolio. Depending on the embodiment of the present invention, flow continues with block 750 either immediately after the trade is approved or at a later time. In an embodiment of the present invention, flow continues with block 750, when accepted portfolios are actually transferred (and revealed) to Sponsor's trading desk, only until after the close of trading on the day the combined portfolio is accepted. In other embodiments of the present invention, the accepted portfolios can be received prior to the end of the trading day for trades that are to be executed before the market close. Flow then continues with block 755 where, upon execution of the actual portfolios, the System automatically transmits execution reports to the institutional clients whose portfolios were included in the accepted combined portfolio.

In an embodiment of the present invention, a method for trading securities portfolios includes receiving an intended portfolio trade; evaluating combinations of the intended portfolio trade with at least one other intended portfolio trade for possible execution at passively determined prices; receiving approval to trade one of the combinations; and transmitting the one combination to be executed after the close of trading on the day in which the approval to trade was received.

The above embodiments are merely illustrative of the numerous possible embodiments and therefore should not be construed so as to limit the scope of the invention. Therefore, it should be understood that while the present invention has been described mainly in terms of a sponsor-centralized PES, those skilled in the art would recognize that the principles of the invention can be used advantageously with alternative embodiments involving, for example, distributed systems as well. Accordingly, all such implementations, which fall within the spirit and scope of the appended claims, will be embraced by the principles of the present invention.

What is claimed is:

1. A method for evaluating securities portfolios for trading, comprising:

receiving a plurality of intended portfolio trades including a first intended portfolio trade, said first intended portfolio trade submitted by a client, each of said plurality of intended portfolio trades including at least two orders to trade different securities;

evaluating, via a computer, risk associated with combinations of said first intended portfolio trade with at least one other of said plurality of intended portfolio trades, said risk evaluation including determining whether a risk profile for execution of any of said combinations is lower than an aggregated risk profile of the respective component portfolios evaluated individually, said risk profile incorporating a per-share commission at which the client is willing to commit to the execution of said first intended portfolio trade at passively determined prices;

receiving approval to trade one of said combinations based on said risk evaluation; and transmitting said one combination for execution after the close of trading on the day in which said approval to trade is received.

2. The method of claim 1, wherein said receiving a first intended portfolio trade comprises either:

receiving an intended portfolio trade from a broker-dealer; or receiving an intended portfolio trade from an institutional investor.

3. The method of claim 1, wherein said evaluating risk associated with combinations of said first intended portfolio trade with at least one other of said plurality of intended portfolio trades comprises:

crossing component trades for each security in said first intended portfolio trade and said at least one other of said plurality of intended portfolio trades to create a combined portfolio trade, said combined portfolio trade including crossed component trades for each security.

4. The method of claim 1, wherein said receiving approval to trade one of said combinations comprises:
requesting approval to trade said one combination; and
receiving a response to said request to trade said one combination.

5. The method of claim 1, wherein said transmitting said one combination for execution after the close of trading on the day in which said approval to trade is received comprises:
transmitting said first intended portfolio trade and said at least one other of said plurality of intended portfolio trades included in said one combination.

6. The method of claim 5, wherein said transmitting occurs after the close of trading on the day in which said approval to trade is received.

7. The method of claim 1, wherein said transmitting said one combination for execution after the close of trading on the day in which said approval to trade is received comprises:
transmitting said one combination to be executed as a principal trade.

8. The method of claim 1, wherein said transmitting said one combination for execution after the close of trading on the day in which said approval to trade is received comprises:
transmitting said one combination to be executed as an agency trade.

9. The method of claim 1, wherein a security associated with each of said two orders to trade is selected from the group consisting of:
an equity;
a derivative;
a warrant;
an option;
a portfolio future; and
a portfolio bond.

10. The method of claim 9, wherein each of said at least two orders to trade comprises:
a trading symbol representing a security to be traded;
a side for the order; and
a quantity of said security to be traded.

11. The method of claim 1, wherein said receiving at least two orders to trade different securities comprises at least one selected from the group consisting of:
receiving said at least two orders to trade different securities at a market closing price;
receiving said at least two orders to trade different securities at a volume-weighted average price; and
receiving said at least two orders to trade different securities at a predetermined price.

12. The method of claim 11, wherein said receiving at least two orders to trade different securities at a predetermined price comprises:
receiving said at least two orders to trade different securities at a price determined by a methodology, said methodology being determined prior to receiving said at least two orders to trade.

13. The method of claim 1, wherein receiving said first intended portfolio trade comprises one selected from the group consisting of:
receiving said first intended portfolio trade from a broker-dealer, said first intended portfolio trade including said per-share commission specified by said broker-dealer; and
receiving said first intended portfolio trade from an institutional investor, said first intended portfolio trade including said per-share commission specified by said institutional investor.

14. The method of claim 13, wherein said broker-dealer specified per-share commission and said institutional investor specified per-share commission each represent the fee for which each said broker-dealer and said institutional investor agree in advance to trade said first intended portfolio trade with a sponsor.

15. The method of claim 1, further comprising:
proposing said per-share commission to a source of said first intended portfolio trade included in said one combination as a result of evaluating risk associated with said one combination.

16. The method of claim 15, wherein said proposing said per-share commission to a source of said first intended portfolio trade included in said one combination as a result of evaluating risk associated with said one combination comprises:
generating automatically said per-share commission; and
transmitting said per-share commission to said source of said first intended portfolio trade.

17. The method of claim 15, wherein said per-share commission represents a fee for which at least one sponsor is willing to execute said first intended portfolio trade at said passively determined prices on behalf of said source.

18. The method of claim 15, wherein said first intended portfolio trade is eligible for said execution by at least one sponsor only if said source explicitly agrees to said per-share commission.

19. The method of claim 15, wherein said proposing said per-share commission to a source of said first intended portfolio trade included in said one combination as a result of evaluating risk associated with said one combination comprises:
generating manually said per-share commission; and
transmitting said per-share commission to said source of said first intended portfolio trade.

20. The method of claim 1, wherein said plurality of intended portfolio trades are invisible to other market participants.

21. The method of claim 1, wherein said evaluating risk associated with combinations of said first intended portfolio trade with at least one other of said plurality of intended portfolio trades comprises:
performing a quantitative analysis of characteristics of each of said combinations.

22. The method of claim 21, wherein said quantitative analysis is performed automatically using data and other information supplied by a sponsor.

23. The method of claim 21, wherein said performing a quantitative analysis of characteristics of each of said combinations comprises evaluating said per-share commission, if specified by a source of said first intended portfolio trade.

24. The method of claim 21, wherein said performing a quantitative analysis of characteristics of each of said combinations generates said per-share commission for executing said first intended portfolio trade in one of said combinations, if said per-share commission is unspecified by a source of said first intended portfolio trade.

25. The method of claim 21, wherein said performing a quantitative analysis of characteristics of each of said combinations includes analysis of at least one of:
a total size in shares;
a total dollar value;
an average individual position size;

a median individual position size;
a size in shares of a largest individual position;
a dollar value of said largest individual position;
a total size as a percentage of average daily volume;
an individual position sizes as a percentage of average daily volume;
a correlation/tracking-error with major market indices;
an average bid-ask spread;
a breakdown by buy/sell orders, shares, and dollar value;
a breakdown by industry group;
a breakdown by listing exchange;
a hard to borrow analysis of individual positions;
risk calculations;
a crossing with a sponsor's portfolio;
a sponsor's proprietary price forecasts or other proprietary data or analyses for individual positions or for the combination as a whole; and
volatility measures.

26. The method of claim 21, wherein performing said quantitative analysis results in a recommendation on whether to execute said one combination.

27. The method of claim 26, wherein said recommendation on whether to execute said one combination of said intended portfolio trades comprises at least one of:
a recommendation to execute said one combination only in part;
a recommendation to execute said one combination; and
a recommendation to decline to execute said one combination.

28. The method of claim 27, further comprising:
transmitting to a source of said first intended portfolio trade a notification of an offer to execute a portion of said first intended portfolio trade, wherein said notification permits said source to choose whether to accept said offer to execute a portion of said first intended portfolio trade for said per-share commission.

29. The method of claim 26, wherein said quantitative analysis results in the generation of a report including said recommendation being sent to a sponsor.

30. The method of claim 29, wherein said report includes statistics and characteristics for said one combination.

31. The method of claim 30, wherein said report does not identify a trading symbol for any component trade included in said one combination, and does not otherwise include information which would permit said sponsor to identify any of said component trades.

32. The method of claim 26, wherein a sponsor decides whether to accept said recommendation on whether to execute said one combination.

33. The method of claim 32, wherein a decision by said sponsor to execute said one combination results in transmitting an immediate notification to a source of said first intended portfolio trade which is included in said one combination that said first intended portfolio trade has been accepted for execution by said sponsor.

34. The method of claim 32, wherein a decision by said sponsor to decline said one combination results in transmitting an immediate notification to a source of said first intended portfolio trade which is included in said one combination that said first intended portfolio trade has been declined for execution by said sponsor.

35. The method of claim 26, wherein a decision whether to accept said recommendation whether to execute said one combination occurs automatically.

36. The method of claim 1, wherein said evaluating risk associated with combinations of said first intended portfolio trade with at least one other of said plurality of intended portfolio trades occurs at least once per calendar week.

37. The method of claim 1, said plurality of intended portfolio trades being received over at least one of:
a telecommunications line;
a wireless telecommunication;
an Internet-based upload; and
an electronic transfer.

38. The method of claim 37, wherein said receiving a first intended portfolio trade comprises:
receiving an invisible intended portfolio trade, said invisible intended portfolio trade being configured to prevent a sponsor from viewing the contents of said invisible intended portfolio trade.

39. The method of claim 1, further comprising:
transmitting a sponsor's promise to execute said first intended portfolio trade included in said one combination at said passively determined price for said per-share commission.

40. The method of claim 39, wherein said intended portfolio trades included in said one combination for which said sponsor has committed to trade, are transmitted to said sponsor for execution and executed by said sponsor, after the close of trading on the day in which said approval to trade is received.

41. The method of claim 1, wherein one of said at least one other of said plurality of intended portfolio trades is received from a broker dealer, said broker dealer acting as a sponsor who can execute all or part of said one combination.

42. A method for evaluating securities portfolios for trading, comprising:
receiving a plurality of intended portfolio trades including a first intended portfolio trade, said first intended portfolio trade submitted by a client, each of said plurality of intended portfolio trades including at least two orders to trade different securities;
evaluating, via a computer, risk associated with combinations of said first intended portfolio trade with at least one other of said plurality of intended portfolio trades, said risk evaluation including determining whether a risk profile for execution of any of said combinations is lower than an aggregated risk profile of the respective component portfolios evaluated individually, said risk profile incorporating a per-share commission at which the client is willing to commit to the execution of said first intended portfolio trade at passively determined prices;
transmitting one of said combinations for execution after the close of trading on the day in which said risk evaluation is performed.

43. The method of claim 42, wherein said receiving a first intended portfolio trade comprises either:
receiving an intended portfolio trade from a broker-dealer; or
receiving an intended portfolio trade from an institutional investor.

44. The method of claim 42, wherein said evaluating risk associated with combinations of said first intended portfolio trade with at least one other of said plurality of intended portfolio trades comprises:
crossing component trades for each security in said first intended portfolio trade and said at least one other of said plurality of intended portfolio trades to create a combined portfolio trade, said combined portfolio trade including crossed component trades for each security.

45. The method of claim 42, further comprising:
receiving approval to trade one of said combinations.

46. The method of claim 42, wherein said transmitting said one combination for execution after the close of trading on the day in which said risk evaluation is performed comprises:

transmitting said first intended portfolio trade and said at least one other of said plurality of intended portfolio trades included in said one combination.

47. The method of claim 46, wherein said transmitting occurs after the close of trading on the day in which said risk evaluation is performed.

48. The method of claim 42, wherein said transmitting said one combination for execution after the close of trading on the day in which said risk evaluation is performed comprises:

transmitting said one combination to be executed as a principal trade.

49. The method of claim 42, wherein said transmitting said one combination for execution after the close of trading on the day in which said risk evaluation is performed comprises:

transmitting said one combination to be executed as an agency trade.

50. The method of claim 42, wherein one of said at least one other of said plurality of intended portfolio trades is received from a broker-dealer, said broker-dealer acting as a sponsor who can execute all or part of said one combination.

* * * * *